United States Patent
Koskinen et al.

(10) Patent No.: US 9,456,140 B2
(45) Date of Patent: Sep. 27, 2016

(54) OPTIMIZED IMAGE STABILIZATION

(75) Inventors: Samu Koskinen, Tampere (FI); Juha Alakarhu, Espoo (FI); Mikko Muukki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/394,169

(22) PCT Filed: Apr. 16, 2012

(86) PCT No.: PCT/FI2012/050370
§ 371 (c)(1),
(2), (4) Date: Jan. 28, 2015

(87) PCT Pub. No.: WO2013/156660
PCT Pub. Date: Oct. 24, 2013

(65) Prior Publication Data
US 2015/0195456 A1    Jul. 9, 2015

(51) Int. Cl.
H04N 5/232 (2006.01)
G03B 5/00 (2006.01)
G02B 27/64 (2006.01)

(52) U.S. Cl.
CPC ........ H04N 5/23258 (2013.01); G02B 27/648 (2013.01); G03B 5/00 (2013.01); H04N 5/23267 (2013.01); H04N 5/23287 (2013.01); G03B 2205/00 (2013.01); G03B 2217/005 (2013.01)

(58) Field of Classification Search
CPC ............ H04N 5/23212; H04N 5/23248; H04N 5/23264; H04N 5/23267; H04N 5/2327; H04N 5/23274; H04N 5/23277; H04N 5/2328; H04N 5/23283; H04N 5/23287

See application file for complete search history.

(56) References Cited

U.S. PATENT DOCUMENTS

| | | | |
|---|---|---|---|
| 5,517,238 A * | 5/1996 | Hirasawa | H04N 5/23212 348/208.11 |
| 5,541,693 A | 7/1996 | Enomoto | 354/202 |
| 5,598,246 A | 1/1997 | Miyamoto et al. | 396/55 |
| 6,009,279 A | 12/1999 | Kai et al. | 396/55 |
| 6,374,048 B1 | 4/2002 | Uenaka et al. | 396/52 |
| 2008/0151065 A1 | 6/2008 | Okumura et al. | 348/208.4 |
| 2008/0309777 A1 * | 12/2008 | Aoyama | G06K 9/00228 348/222.1 |
| 2009/0028537 A1 | 1/2009 | Tamura | 396/55 |

FOREIGN PATENT DOCUMENTS

| | | |
|---|---|---|
| EP | 1 884 817 A2 | 2/2008 |
| JP | 07-020547 | 1/1995 |
| JP | H-0798466 A | 4/1995 |
| JP | 08-262517 | 10/1996 |
| JP | 2000002900 A | 1/2000 |
| JP | 2002 196384 | 7/2002 |
| JP | 2004 258250 | 9/2004 |
| JP | 2005181712 A | 7/2005 |
| JP | 2006138889 A | 6/2006 |
| JP | 2008017077 A | 1/2008 |
| JP | 2008157979 A | 7/2008 |

* cited by examiner

Primary Examiner — Timothy J Henn
(74) Attorney, Agent, or Firm — Harrington & Smith

(57) ABSTRACT

A system for optimized image stabilization, wherein a focus lock of a camera unit having an image stabilizer is detected and in response to this detection, the image stabilization is suspended. A target position for the image stabilizer is determined and the image stabilizer is driven to the target position. In response to a detected shutter release, the image stabilization is continued.

29 Claims, 4 Drawing Sheets

OPTIMIZED IMAGE STABILIZATION

TECHNICAL FIELD

The present application generally relates to image stabilization.

BACKGROUND

In cameras, blur caused by hand shake is often reduced by employing image stabilization. It is attempted to form an image such that each part of an image corresponds to a given narrow beam ahead of the camera even if the camera were slightly shaken. In mechanical image stabilization a stabilized image is achieved by suitably moving the optical unit of the camera or, in case of digital imaging, alternatively or in addition the image sensor.

Modern cameras often implement optical image stabilization by tilting one or more lenses within a barrel of an objective. A typical objective of a single-lens reflex (SLR) camera has easily ten or more lenses and slight tilting of one or more of the lenses may counter handshake by an equivalent of increasing lens aperture by 3-4 exposure value steps without significant distortion in the camera image.

SUMMARY

Various aspects of examples of the invention are set out in the claims.

According to a first example aspect of the invention, there is provided an apparatus comprising:
a memory comprising instructions; and
a processor configured, based on the instructions, to:
detect focus lock of a camera unit, the camera unit having an image stabilizer capable of image stabilization;
cause suspending of image stabilization in response to detecting the focus lock;
determine a target position for the image stabilizer;
cause driving of the image stabilizer to the target position;
detect shutter release; and
cause continuing of the image stabilization in response to the shutter release.

After driving the image stabilizer to the target position, the user may be allowed to frame a desired image so that the image stabilizer is driven to the target position.

The image stabilizer may comprise any one or more of optical, sensor shift, mirror shift or software image stabilizer.

The detecting of the focus lock may comprise detecting that focal length of optics of the camera unit is locked.

The target position may be a position anticipating the stabilizing movement needed at shutter release.

The processor may be further configured to detect an orientation of the camera unit prior to the determining of the target position.

The processor may be further configured to recognize a user of the camera unit prior to the determining of the target position.

The processor may be further configured to detect a configuration of the camera unit prior to the determining of the target position.

The processor may be further configured to detect movement of the camera unit prior to the determining of the target position.

The processor may be further configured to determine the target position using at least one anticipation parameter chosen according to prevailing conditions.

The apparatus may be further configured to maintain user history.

The user history may contain information about movements caused by the user on taking photographs with the camera unit.

The processor may be further configured to calculate the at least one anticipation parameter from the user history.

The apparatus may be further configured to provide a notification for a user of a suitable moment of framing a desired image.

According to a second example aspect of the invention, there is provided a method, comprising:
detecting focus lock of a camera unit, the camera unit having an image stabilizer capable of image stabilization;
suspending image stabilization in response to detecting the focus lock;
determining a target position for the image stabilizer;
driving the image stabilizer to the target position;
detecting shutter release of the camera unit; and
continuing image stabilization in response to shutter release.

The image stabilization may comprise any one or more of optical, sensor shift, mirror shift or software image stabilization.

The detecting of the focus lock may comprise detecting that focal length of optics of the camera unit is locked.

The target position may be a position anticipating the stabilizing movement needed at shutter release.

The method may further comprise detecting an orientation of the camera unit prior to the determining of the target position.

The method may further comprise recognizing a user of the camera unit prior to the determining of the target position.

The method may further comprise detecting a configuration of the camera unit prior to the determining of the target position.

The method may further comprise detecting movement of the camera unit prior to the determining of the target position.

The target position may be determined using at least one anticipation parameter chosen according to the prevailing conditions.

The method may further comprise maintaining user history.

The user history may contain information about movements caused by the user on taking photographs with the camera unit.

The at least one anticipation parameter may be calculated from the user history.

The method may further comprise providing a notification for a user of a suitable moment of framing a desired image.

According to a third example aspect of the invention, there is provided a computer program, comprising:
code for performing a method of an example aspect of the invention,
when the computer program is run on a processor.

According to a fourth example aspect of the invention, there is provided a memory medium comprising the computer program of the third example aspect of the invention.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
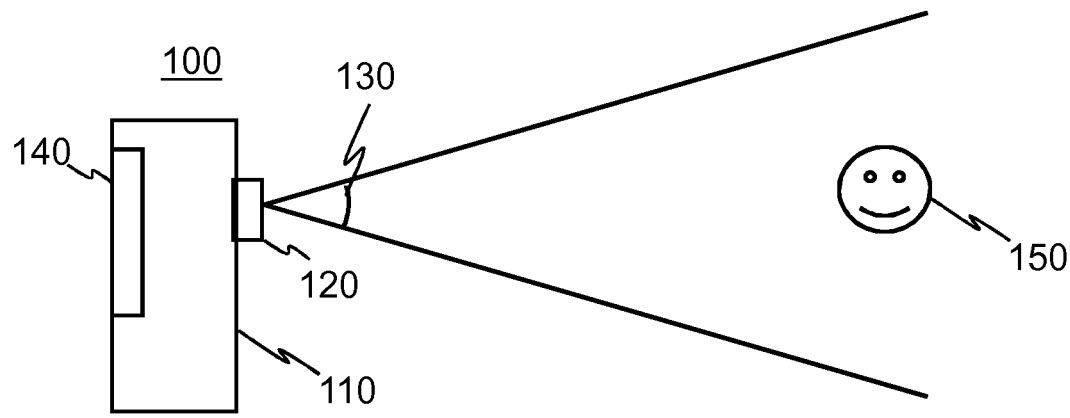
FIG. 1 shows a schematic system for use as a reference with which some example embodiments can be explained.

FIG. 1 shows a schematic system 100 for use as a reference with which some example embodiments can be explained. The system 100 comprises a device 110 such as a camera phone, gaming device, personal digital assistant, tablet computer or a camera having a camera unit 120 that is capable of capturing images with a field of view 130. The device 110 further comprises a display 140. FIG. 1 also shows an image object 150 that is being imaged by the camera unit 120.

Figure 2:
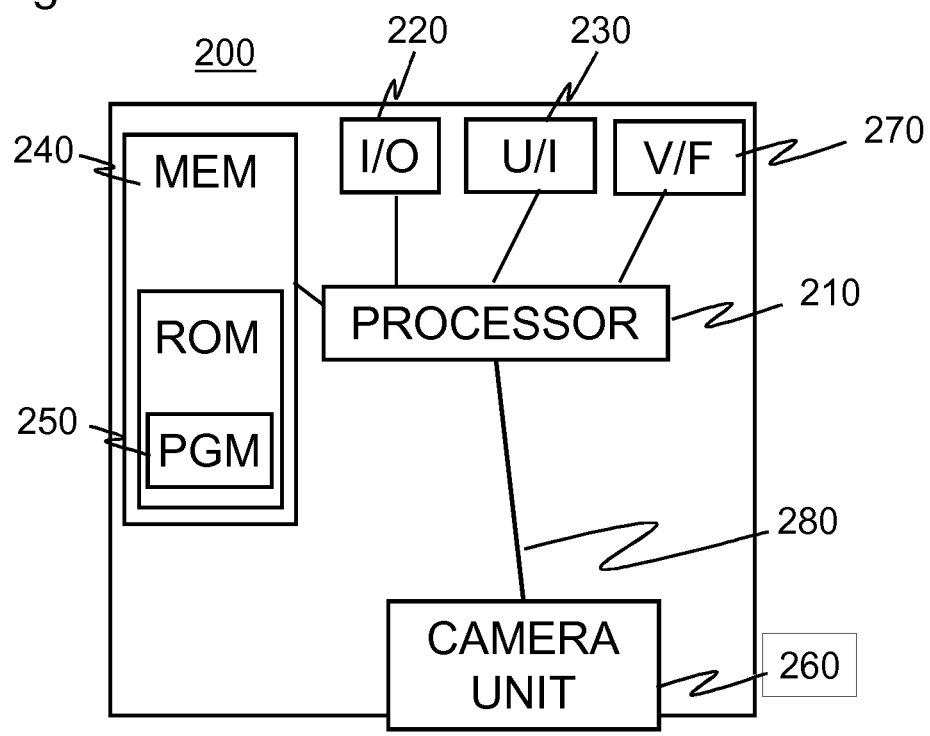
FIG. 2 shows a block diagram of an apparatus of an example embodiment.

FIG. 2 shows a block diagram of an apparatus 200 of an example embodiment. The apparatus 200 is suited for operating as the device 110. The apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the host processor 210. The software 250 may comprise one or more software modules and can be in the form of a computer program product that is software stored in a memory medium. The apparatus 200 further comprises a camera unit 260 and a viewfinder 270 each coupled to the host processor 210. The camera unit 260 and the processor 210 are connected via a camera interface 280.

Figure 3:
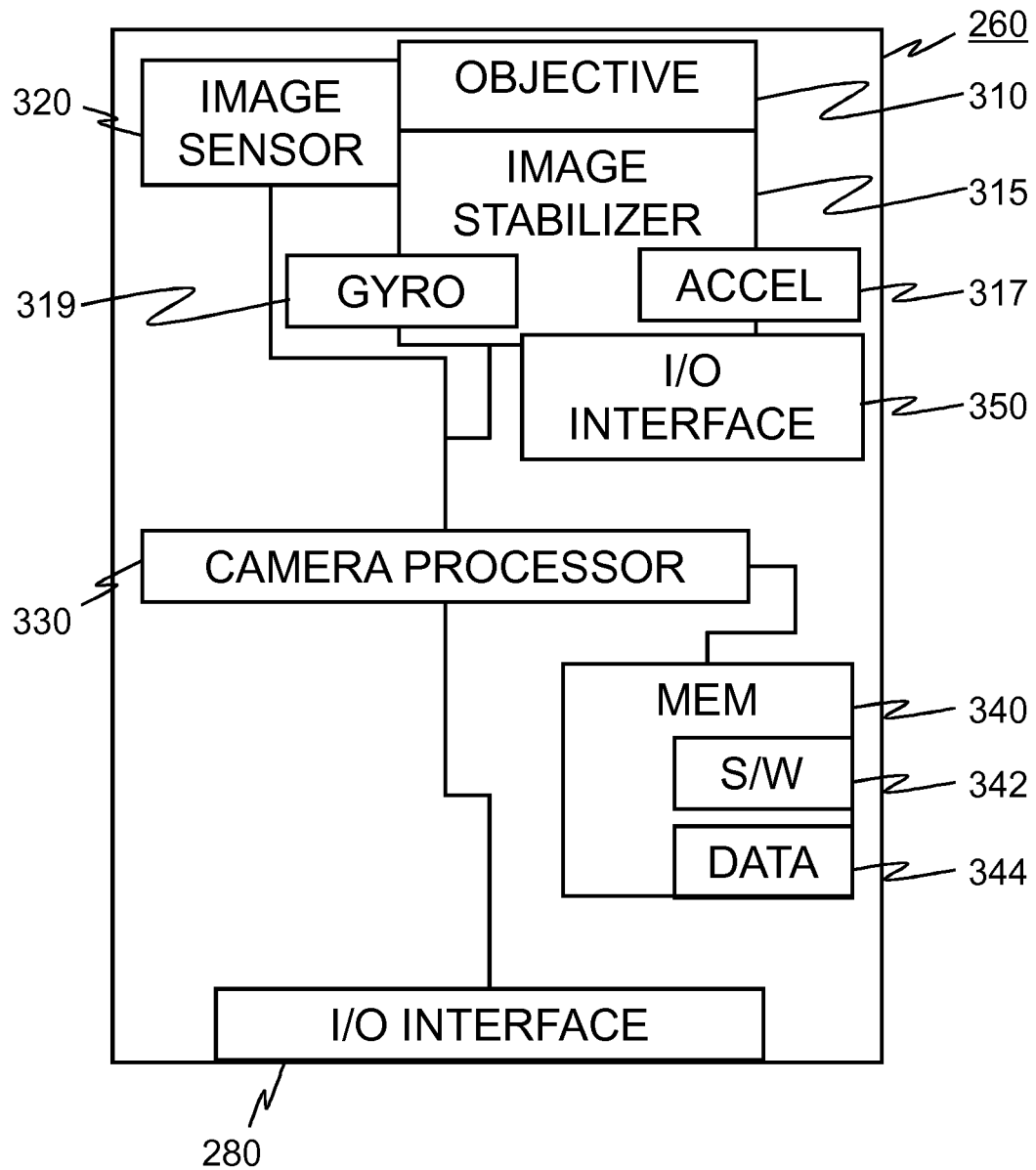
FIG. 3 shows a block diagram of a camera unit of an example embodiment.

Term host processor refers to a processor in the apparatus 200 in distinction of one or more processors in the camera unit 260, referred to as camera processor(s) 330 in FIG. 3. Depending on implementation, different example embodiments share processing of image information and control of the camera unit 260 differently between the camera unit and one or more processors outside the camera unit. Also, the processing is performed on the fly in an example embodiment and with buffering in another example embodiment. It is also possible that a given amount of images or image information can be processed on the fly and after than buffered operation mode is used as in one example embodiment.

It shall be understood that any coupling in this document refers to functional or operational coupling; there may be intervening components or circuitries in between coupled elements unless expressly otherwise described.

The communication interface module 220 is configured to provide local communications over one or more local links. The links may be wired and/or wireless links. The communication interface 220 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The host processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one host processor 210, but the apparatus 200 may comprise a plurality of host processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 210, an input of the processor 210 configured to receive information from the camera unit and an output of the processor 210 configured to provide information to the viewfinder. In one example embodiment, the apparatus refers to a device that receives image information from the image sensor via a first input and produces sub-images to a second input of an image processor, which image processor is any circuitry that makes use of the produced sub-images. For instance, the image processor may comprise the processor 210 and the device in question may comprise the camera processor 330 and the camera interface 280 shown in FIG. 3.

FIG. 3 shows a block diagram of a camera unit 260 of an example embodiment. The camera unit 260 comprises optics such as an objective 310, an image stabilizer 315, an image sensor 320, a camera processor 330, a memory 340 comprising data 344 and software 342 with which the camera processor 330 can manage operations of the camera unit 260. The camera processor 330 operates as an image processing circuitry of an example embodiment. An input/output or camera interface 280 is also provided to enable exchange of information between the camera unit 260 and the host processor 210. In a further example embodiment, a further input/output or image stabilizer interface 350 is provided to exchange information between the image stabilizer 315 and an external control unit (not shown). Furthermore, in an example embodiment, the camera unit has a light sensitive film medium instead of an image sensor 320.

In an example embodiment, the data 344 stored in the memory 340 comprises anticipation parameters for the image stabilization optimization. In a further example embodiment, the anticipation parameters are assigned to user profile data stored in the memory 340. In a further example embodiment, the anticipation parameters and user profile data are stored in the memory 240, memory 340 or in both memories 240, 340. Both memories contain either the full anticipation parameters and user profile data, or both memories contain a part of the anticipation parameters and user profile data. In a further example embodiment, an additional memory, for example in connection with the image stabilizer 315, is used for storing the anticipation parameters and/or the user profile data.

The image sensor 320 is, for instance, a charge-coupled device (CCD) or complementary metal oxide semiconductor (CMOS) unit. In case of a CMOS unit, the image sensor 320 can also contain built-in analog-to-digital implemented on common silicon chip with the image sensor 320. In an alternative example embodiment, a separate analog-to-digital (A/D) conversion is provided between the image sensor 320 and the camera processor 330. The camera processor 330 takes care in example embodiments of one or more of the following functions: pixel colour interpolation; white balance correction; edge enhancement; anti-aliasing of images; vignetting correction; combining of subsequent images for high dynamic range imaging; bayer reconstruction filtering; chromatic aberration correction; dust effect compensation.

In an example embodiment, the apparatus 200 further comprises a user interface (U/I) 230. The user interface comprises on or more elements with which the user operates the apparatus 200 and the camera unit 260. Said elements comprise for example a shutter button, menu buttons and a touch screen. The shutter button and the menu buttons may be hardware buttons or for example buttons displayed on a touch screen. The image stabilizer 315 is configured to stabilize the image that is cast by the objective 310 on the image sensor 320 by performing rapid movements when necessary. The image stabilizer 315 is configured to perform movements of a part or parts of the apparatus 200 in order to vary the optical path to the image sensor 320 for compensating the vibration of the camera unit 260, or the whole apparatus 200. The vibration is often caused by hand shake, i.e. the user operating the apparatus 200 causes the vibrations by operating the apparatus 200. In an example embodiment, the image stabilizer 315 is an optical image stabilizer configured to move a lens or several lenses. Alternatively, the image stabilizer 315 is configured to move the image sensor 320 or a mirror. In a further example embodiment the image stabilizer is implemented with a software image stabilization method. It is also possible to use more than one different image stabilizing techniques and in one example embodiment, two or more of the mentioned image stabilization techniques are combined.

The image stabilizer 315 is in connection with a gyroscope 319 detector and acceleration sensors 317. The acceleration sensors 317 detect acceleration in several directions, for example in three directions perpendicular to each other, and accordingly are able to measure acceleration in any direction. The gyroscope detects the orientation of the apparatus 200. The acceleration and orientation detected by the acceleration sensors 317 and gyroscope 319 are transmitted to the image stabilizer 315 directly or indirectly, for example through the camera processor 330.

In an example embodiment the user of the apparatus 200 has a user profile. The user profile contains personal preferences for configuring the apparatus for use, such as default settings of the camera unit 260. In an example embodiment, the host processor 210, the camera processor 330 and/or the image stabilizer 315 is/are configured to collect and store data into the memory 240, 340 each time the user operates the camera unit 300 of the apparatus 200. In an example embodiment, the data collected and stored, i.e. a user history, comprises the measured acceleration and orientation of the apparatus, as the shutter button is pressed, i.e. the vibrations caused by user hand shake during imaging. Furthermore, the data collected and stored comprises imaging parameters for each imaging operation, such as white balance, focal length and exposure time. In a further example embodiment, no user profiles are stored, if the apparatus for example only has a single user. Operations that the image stabilizer is described to perform can also or alternatively be performed with different other equipment in different embodiments, e.g. with the host processor 210, the camera processor 330 and/or the image stabilizer 315.

In an example embodiment, a user of the apparatus 200 chooses a user profile before using the apparatus 200. In an example embodiment, the apparatus 200 is configured to recognize the user and choose the respective user profile automatically. In an example embodiment, user recognition is based on voice analysis and/or fingerprint recognition, and/or previously collected imaging operation data, for example hand shake profile.

In an example embodiment, the image stabilizer 315 is configured to obtain anticipation parameters for image stabilization optimization. The anticipation parameters are obtained, for example, from the data collected. In an example embodiment, the anticipation parameters are stored, and assigned to a user profile, if user profiles have been stored. The anticipation parameters are obtained, for example, using statistical analysis methods. An anticipation parameter or several anticipation parameters can be assigned to different imaging situations, for example for different orientations of the apparatus 200 or for different lighting conditions. The image stabilizer 315 is further configured to update the anticipation parameters after every imaging operation. In an example embodiment, each user profile is further assigned different anticipation parameters, retrieved from the data collected and stored from imaging operations carried out using the corresponding user profile.

In an example embodiment the image stabilizer 315 is configured to determine a target position, and the shift needed thereto from the current position, for example the lens or lenses of the objective 310, based on the anticipation parameters corresponding to the imaging situation and/or user. The target position is such that the image stabilizer is able to perform the movement anticipated to be needed, based on the anticipation parameters, during exposure. In an example embodiment the determining of the target position is done by calculating the target position.

Figure 4:
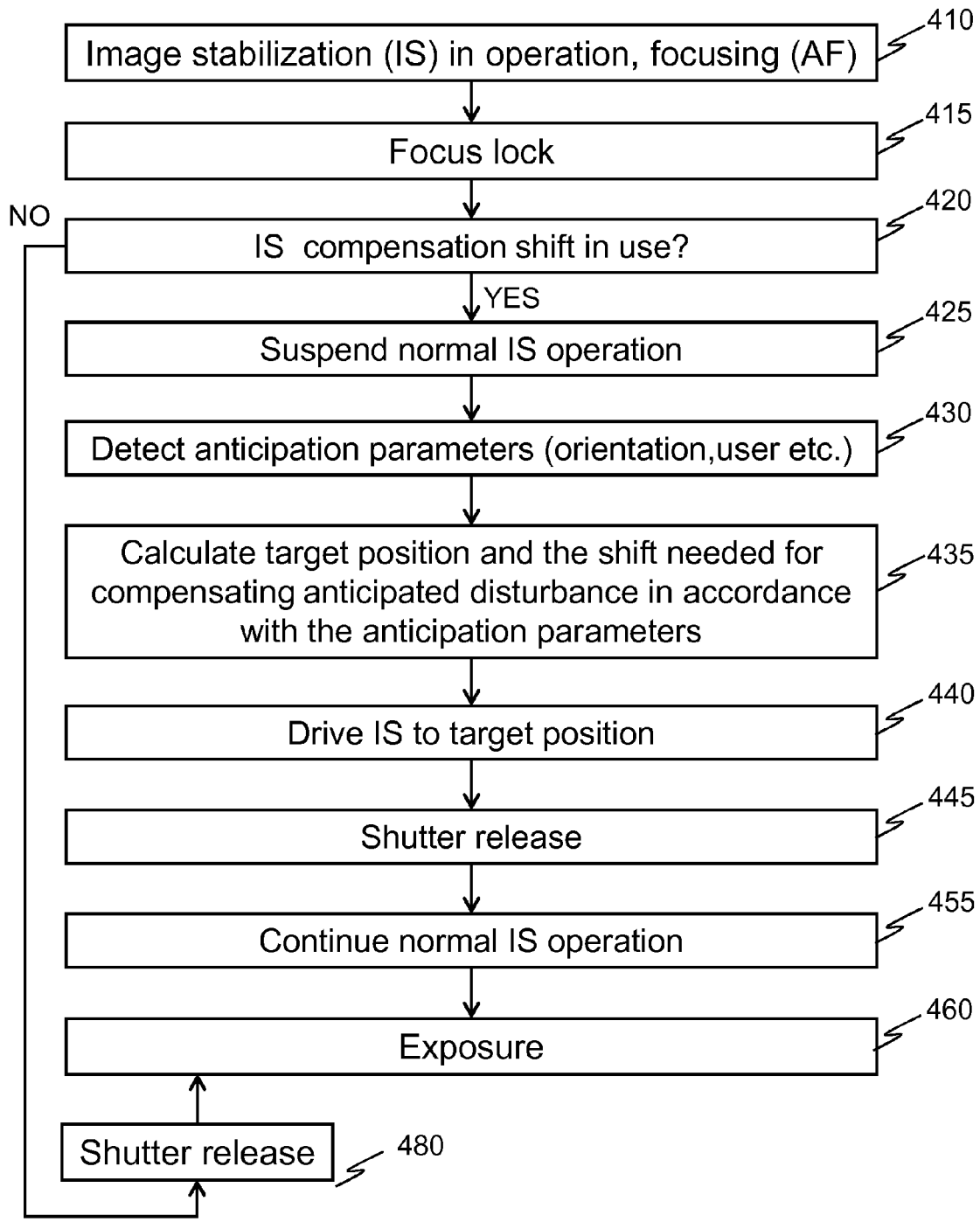
FIG. 4 shows a flow chart of a method of an example embodiment.

FIG. 4 illustrates a flow chart of an example embodiment of optimized image stabilization. As the camera unit 300 is focusing using auto focus, the image stabilizer 315 is functioning 410 in a normal mode and trying to stabilize the image that is cast by the objective 310 on the image sensor 320 by performing rapid movements when necessary. When the camera unit has achieved focus lock 415, for example because the user has half pressed the shutter button in order to lock the focus on an object, it is decided whether the image stabilization compensation shift is in use or not 420. If not the, the image stabilization continues to operate in a normal mode, and shutter release 480 and exposure 475 follow. In an example embodiment, when the focus is locked, the focal length of the objective 310 is effectively locked. In an example embodiment, the camera unit 300 is not configured for auto focus and focus lock, but instead has a two-step shutter button, wherein the first step indicates the desire of the user to release the shutter and the second step releases the shutter. In such a case, with reference to the optimized image stabilization according to example embodiments, the indication of the user of the desire to release the shutter corresponds to the focus lock.

If the image stabilizer 315 compensation shift is in use, normal operation of the image stabilization is suspended 425. A target objective position and the shift needed to arrive to that target position from the position in which the operation of the image stabilization was suspended is determined based on the anticipation parameters 435. The anticipation parameters that are used are selected in accordance with each imaging situation, i.e. the prevailing conditions. If a user profile is selected, the anticipation parameters are further selected in accordance with the user history. In an example embodiment, the target position is a combination of the target positions required by each anticipation parameter. For example, the orientation of the device might require a certain shift and the user a further shift. As the target position and the shift have been determined, the image stabilizer 315 drives the objective to the target position 440. In response, the image formed by the image sensor 320 shifts, but the user can compensate the shift by then framing the image as she likes. Moreover, often the focus is locked to the centre of image and the user has to do the final adjustment of framing at this stage anyway. In an example embodiment, the user is given a notification, for example a visual or audio notification, that the target position has been acquired and the user should proceed to frame the image in a desired manner. Then, the shutter, whether mechanical or not, of the camera unit is released 445, for example by the user pressing the shutter button fully. After the shutter has been released, normal image stabilization operation is continued 455 from the target position allowing the image stabilizer 315 to stabilize the image that is cast by the objective 310 on the image sensor 320 by performing rapid movements as the anticipated disturbance during exposure 460 is realized.

Figure 5A:
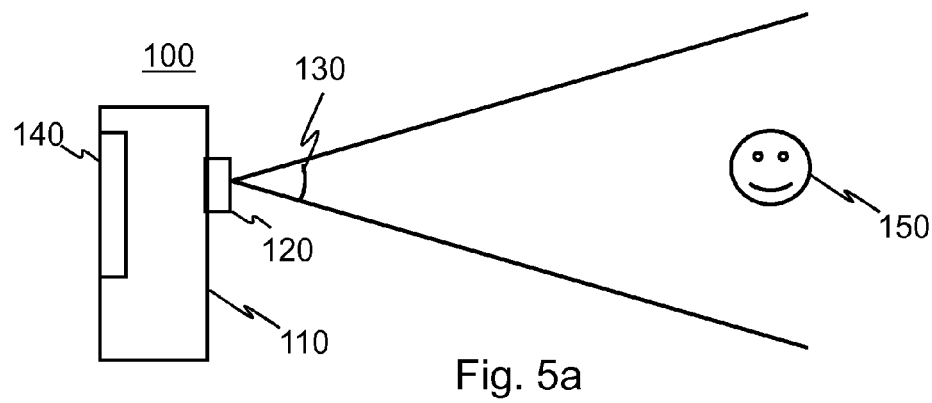
FIGS. 5a to 6b show a schematic and exaggerated example of the operation of the system of an example embodiment.
Figures 5B, 5C:
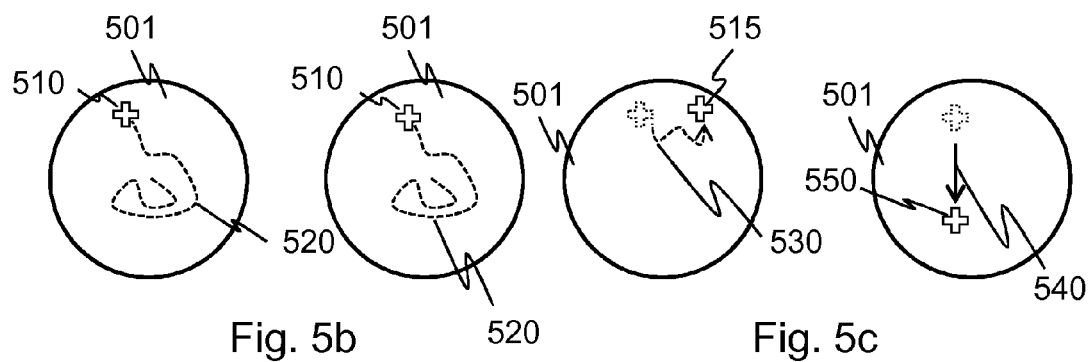

Some use cases relating to given example embodiments of the optimized image stabilization are presented in the following. FIGS. 5a to 6b illustrate a first use case of the optimized image stabilization according to an example embodiment. The user of the apparatus 110, e.g. of a camera phone, wishes to capture an image of an object 150 in the field of view 130. The camera unit 120 of the apparatus 110 comprises the image stabilizer 315. In the first use case, the apparatus 110 is in landscape mode and the shutter button is a hardware button on top of the apparatus in a manner conventional for cameras. FIG. 5b shows an exaggerated view of the position of the objective of the camera unit, as the image stabilizer is performing movements 520, to compensate the vibrations caused by for example hand shake. The position 510 of the optical path of the camera unit, or the centre of the objective, is shown and referred to hereinafter as image stabilizer position. The left hand situation, wherein the optimized image stabilization according to an example embodiment has been turned off, and the right hand situation with the optimized image stabilization according to an example embodiment has been turned on, do not differ from each other during focusing. In both cases, the image stabilization attempts to resist hand-shake caused movements of the image, e.g. as shown on the viewfinder 270, shown for example by the display 140.

FIG. 5c shows an exaggerated view of the image stabilizer position as the focus has been locked. On the left hand side, image stabilization optimization is disabled. Thus, the image stabilizer continues to perform compensating movements 530 resulting in an image stabilizer position 515 at the edge of the stabilizer area 501. On the right hand side, image stabilization optimization is enabled. The normal operation of the image stabilizer is therefore suspended and the image stabilizer determines a target position 550 and the shift 540 needed to reach the target position as hereinbefore described e.g. based on the anticipation parameters. In the depicted use case, the target position is at the lower part of the stabilizer area 501, since the hand shake when pressing the shutter button is anticipated, based on e.g. statistical analysis of previous use data of the apparatus, to cause a downward tilt shown in FIG. 6a.

Figure 6A:
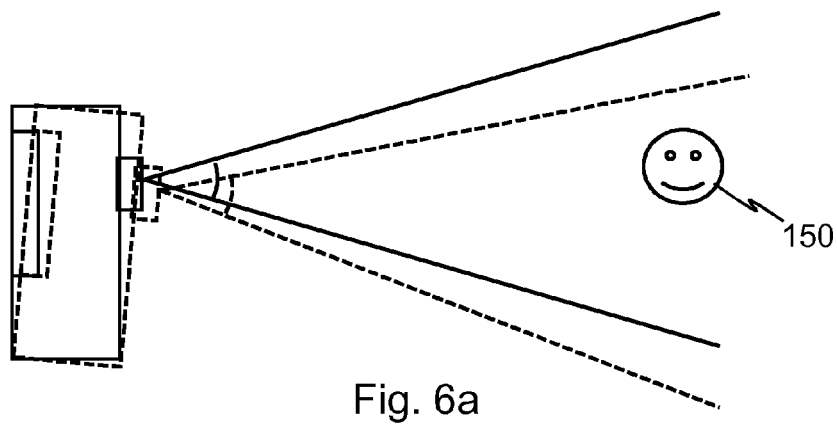
Figure 6B:
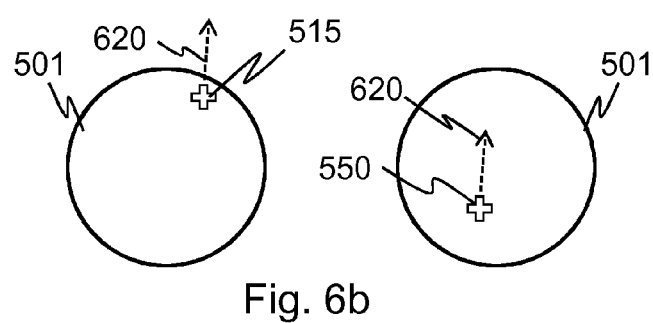

FIG. 6b shows the situation as the shutter button is pressed, the shutter released and exposure begins. On the left hand side, image stabilization optimization is disabled. Thus, the image stabilizer 315 seeks to correct the downward tilt caused by pressing the shutter button, but is unable to perform the necessary movement 620 starting from the position 515, which already lies at the edge of the stabilizer area 501. On the right hand side the image stabilization optimization is enabled and the image stabilizer 315 performs the correcting movement 620 starting from the target position 550. As a result, the image stabilization has a sufficiently large freedom of movement and the entire tilt can be compensated, which reduces forming of motion blur.

In a second use case, the shutter button is provided on a touch screen of an apparatus, e.g. a camera phone, and situated at the lower part of the apparatus in portrait mode. Pressing this shutter button by touching the screen is likely to cause an upward tilt which needs to be corrected by image stabilizer 315. Accordingly, the target position in the second use case for starting the exposure lies in the upper part of the stabilizer area 501.

In a third use case, the target starting position for exposure is not only determined based on the orientation of the camera, but also from an anticipation parameter of a user profile. In this third use case, the user of the camera is a small child and realistically a larger hand shake is to be expected than for an adult. The apparatus recognizes the user as a child either by a user profile that has been chosen, or by recognizing for example the smaller size of the hands of the user. The size of the hands can be detected e.g. by forming one or more touch sensitive surfaces around the apparatus. The anticipation parameters for a child result in a larger anticipated compensation movement needed. Accordingly, the target image stabilizer position at the beginning of exposure is different to that of an adult user.

In a fourth use case, the target image stabilizer position for exposure is chosen based on the user history, i.e. from anticipation parameters stored in a user profile. The user recognition is performed, for instance, based on one or more of the following: a user profile that has been chosen; by recognizing for example the voice or a fingerprint or hand shake characteristics of a user; according to the time of the day. The user profile contains anticipation parameters calculated from previous imaging operations the user has performed, i.e. from the user history. The anticipation parameters can be updated e.g. after each new operation. Accordingly, the target image stabilizer position for exposure is chosen for each situation. For example, it is known that in poor lighting conditions in portrait mode the user tends to tilt the apparatus in a certain way.

In a fifth use case, the image stabilizer 315 receives information from the gyroscope 319 and acceleration sensors 317 on the orientation and movement of the camera. Accordingly, a target image stabilizer position for exposure is determined from anticipation parameters of a situation wherein the user is carrying out a panning movement, or wherein the user is otherwise moving, for example while riding in a vehicle. In a yet further use case, the image stabilizer 315 receives measurement data from other sensors as well. For example, the microphone of a camera phone can be used to detect wind conditions when operating outside, and/or a satellite positioning system is used to establish that a user is afloat at sea or ocean in order to compensate for likely rocking of a boat.

Without in any way limiting the scope, interpretation, or application of the claims appearing below, a technical effect of one or more of the example embodiments disclosed herein is that an optimal image quality independent of the situation is achieved. Another technical effect of one or more of the example embodiments disclosed herein is providing an individual correction for each user thus improving user experience. Another technical effect of one or more of the example embodiments disclosed herein is to improve image stabilization without complicated hardware adaptations.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
a camera unit, the camera unit having an image stabilizer capable of image stabilization;
at least one processor; and
at least one memory including computer program code, the at least one memory and the computer program code configured, with the at least one processor, to cause the apparatus to perform the following:
detect focus lock of the camera unit;
determine that image stabilization compensation shift is in use;
cause suspending of image stabilization in response to determining that image stabilization compensation shift is in use;
determine a target position for the image stabilizer;
cause driving of the image stabilizer to the target position; and
cause continuing of the image stabilization during exposure.

2. The apparatus of claim 1, wherein the at least one memory and the computer program code are further configured, with the at least one processor, to cause the apparatus to detect shutter release, and to cause the continuing of the image stabilization in response to the shutter release.

3. The apparatus of claim 1, wherein the image stabilizer is one of optical, sensor shift, mirror shift or software image stabilizer.

4. The apparatus of claim 1, wherein the detecting of the focus lock comprises detecting that focal length of optics of the camera unit is locked.

5. The apparatus of claim 1, wherein the target position is a position anticipating the stabilizing movement needed at shutter release.

6. The apparatus of claim 1, wherein the at least one memory and the computer program code are further configured, with the at least one processor, to cause the apparatus to detect an orientation of the camera unit prior to the determining of the target position.

7. The apparatus of claim 1, wherein the at least one memory and the computer program code are further configured, with the at least one processor, to cause the apparatus to recognize a user of the camera unit prior to the determining of the target position.

8. The apparatus of claim 1, wherein the at least one memory and the computer program code are further configured, with the at least one processor, to cause the apparatus to detect a configuration of the camera unit prior to the determining of the target position.

9. The apparatus of claim 1, wherein the at least one memory and the computer program code are further configured, with the at least one processor, to cause the apparatus to detect movement of the camera unit prior to the determining of the target position.

10. The apparatus of claim 1, wherein the at least one memory and the computer program code are further configured, with the at least one processor, to cause the apparatus to determine the target position using at least one anticipation parameter chosen according to the prevailing conditions.

11. The apparatus of claim 1, wherein the at least one memory and the computer program code are further configured, with the at least one processor, to cause the apparatus to maintain a user history.

12. The apparatus of claim 11, wherein the user history contains information about movements caused by the user on taking photographs with the camera unit.

13. The apparatus of claim 11, wherein the at least one memory and the computer program code are further configured, with the at least one processor, to cause the apparatus to calculate the at least one anticipation parameter from the user history.

14. The apparatus of claim 1, wherein the at least one memory and the computer program code are further configured, with the at least one processor, to cause the apparatus to provide a notification for a user of a suitable moment of framing a desired image.

15. A method comprising:
- detecting focus lock of a camera unit, the camera unit having an image stabilizer capable of image stabilization;
- determining that image stabilization compensation shift is in use;
- suspending image stabilization in response to determining that image stabilization compensation shift is in use;
- determining a target position for the image stabilizer;
- driving the image stabilizer to the target position; and
- continuing image stabilization during exposure.

16. The method according to claim 15, further comprising detecting shutter release and continuing the image stabilization in response to shutter release.

17. The method according to claim 15, wherein the image stabilization is one of optical, sensor shift, mirror shift or software image stabilization.

18. The method of claim 15, wherein the detecting of the focus lock comprises detecting that focal length of optics of the camera unit is locked.

19. The method of claim 15, wherein the target position is a position anticipating the stabilizing movement needed at shutter release.

20. The method of claim 15 further comprising detecting an orientation of the camera unit prior to the determining of the target position.

21. The method of claim 15 further comprising recognizing a user of the camera unit prior to the determining of the target position.

22. The method of claim 15 further comprising detecting a configuration of the camera unit prior to the determining of the target position.

23. The method of claim 15 further comprising detecting movement of the camera unit prior to the determining of the target position.

24. The method of claim 15, wherein the target position is determined using at least one anticipation parameter chosen according to prevailing conditions.

25. The method of claim 15 further comprising maintaining a user history.

26. The method of claim 25, wherein the user history contains information about movements caused by the user on taking photographs with the camera unit.

27. The method of claim 25, wherein the at least one anticipation parameter is calculated from the user history.

28. The method of claim 15, further comprising notifying a user of a suitable moment of framing a desired image.

29. A computer program product comprising a non-transitory computer-readable storage medium bearing computer program code embodied therein for use with a computer, the computer program code comprising code for performing comprising:
- detecting focus lock of a camera unit, the camera unit having an image stabilizer capable of image stabilization;
- determining that image stabilization compensation shift is in use;
- suspending image stabilization in response to determining that image stabilization compensation shift is in use;
- determining a target position for the image stabilizer;
- driving the image stabilizer to the target position; and
- continuing image stabilization during exposure.

* * * * *

UNITED STATES PATENT AND TRADEMARK OFFICE
CERTIFICATE OF CORRECTION

| | |
|---|---|
| PATENT NO. | : 9,456,140 B2 |
| APPLICATION NO. | : 14/394169 |
| DATED | : September 27, 2016 |
| INVENTOR(S) | : Koskinen et al. |

It is certified that error appears in the above-identified patent and that said Letters Patent is hereby corrected as shown below:

In the Claims

Claim 29, col. 12, line 20 "comprising" should be deleted.

Signed and Sealed this
Twentieth Day of December, 2016

Michelle K. Lee
*Director of the United States Patent and Trademark Office*